(12) United States Patent
May (10) Patent No.: US 7,438,266 B2
(45) Date of Patent: Oct. 21, 2008

(54) STACKABLE INSTRUMENT STADIUM HARDWARE STAND

(76) Inventor: Randall L May, 2 Trafalagar, Newport Beach, CA (US) 92660-6830

( * ) Notice: Subject to any disclaimer, the term of this patent is extended or adjusted under 35 U.S.C. 154(b) by 175 days.

(21) Appl. No.: 11/450,679

(22) Filed: Jun. 9, 2006

(65) Prior Publication Data
US 2008/0048074 A1 Feb. 28, 2008

(51) Int. Cl.
*F16M 11/00* (2006.01)
(52) U.S. Cl. .............. 248/163.1; 248/166; 248/431; 248/435
(58) Field of Classification Search .............. 248/125.1, 248/125.8, 163.1, 431, 166, 434, 435, 170, 248/171, 173
See application file for complete search history.

(56) References Cited

U.S. PATENT DOCUMENTS

| 4,827,958 | A | 5/1989 | Cantwell et al. | |
| 5,072,910 | A * | 12/1991 | May | 248/412 |
| 5,308,035 | A | 5/1994 | Ross | |
| 5,329,873 | A | 7/1994 | Tiballi | |
| 6,038,802 | A | 3/2000 | Tidwell | |
| 6,491,266 | B1 * | 12/2002 | Chen | 248/163.1 |
| 6,643,966 | B2 | 11/2003 | Schmitt | |
| 6,857,607 | B1 | 2/2005 | Burris | |
| 2005/0045786 | A1 * | 3/2005 | Tupper et al. | 248/229.2 |
| 2005/0092878 | A1 * | 5/2005 | Murray et al. | 248/171 |

\* cited by examiner

*Primary Examiner*—Amy J. Sterling
(74) *Attorney, Agent, or Firm*—Kirk A. Buhler; Buhler & Associates (57) ABSTRACT

An expandable musical instrument stand where the components of the stand are constructed with tubular sections. The tubular section are extruded to include dovetail cross sectional areas that can be stacked and a semi-circular locking collar slides into the dovetail guide and locks the tubular sections together. The expandable construction allows the musical stand to be broken down into smaller sections to make it easer to transport and simple to erect. The expandable section is ideally used with the center tube with a three or four leg stand where the legs can be collapsible on the center tube or the legs can be constructed with the same or similar construction as the center tube where they can be stacked and clamped with a collar.

19 Claims, 7 Drawing Sheets

Figure 15

STACKABLE INSTRUMENT STADIUM HARDWARE STAND

FIELD OF THE INVENTION

This invention relates generally to an expandable stacked musical instrument stand stands, and more particularly to an instrument stand where tubular members and even more specifically the center tube can be extended by stacking the members end to end and connecting them with a semi-circular collar that locks the tubular sections.

BACKGROUND OF THE INVENTION

Today many tripod and or other types of stands are configured to be collapsible or extendable. One of the major benefits of making stands collapsible or extendable is that that stands can be transported and stored in a smaller size. Most of these stands are desirable for supporting various articles and instruments since they provide selective height adjustment and a stable support. They are particularly useful is supporting such things as cameras, video equipment, telescopes, surveying instruments, and musical instruments. Tripod stands for drums, however, raise special problems when used on steps or stairs of an auditorium or stadium.

There are several patents that describe various adjustable tripod stand devices. Bruneau U.S. Pat. No. 1,517,825 shows a tripod support for a table having adjustable legs.

Some patents describe tubular construction where tubes nest inside at least a portion of each other to extend the length of the tubular structure, examples of this type of extendable construction are found in Cantwell et al. U.S. Pat. No. 4,827, 958, Tiballi U.S. Pat. No. 5,329,873, Tidwell U.S. Pat. No. 6,038,802 and Burris U.S. Pat. No. 6,857,607. While these each disclose stacking tubular sections upon each other to form a longer tubular section, they all require the joining to be formed with members that engage within each other.

U.S. Pat. No. 6,643,966 issued to Schmitt is formed with rectangular tubes and an internal member is placed between each tubular section to join the tubes together. A pin or other similar hardware is placed through the tubular sections to retain them in place. While these each disclose stacking tubular sections upon each other to form a longer tubular section, they all require the joining to be formed with members that engage completely within each other.

Boehm, U.S. Pat. No. 3,570,130 discloses a holding device for surveying instruments which includes a channel-like mounting bracket with a pair of instrument gripping clamps and a pair of adjustable legs thereon which cooperate with the instrument to form a tripod type support for supporting the instrument in a reference position.

This invention is an improvement over May U.S. Pat. No. 5,072,910. It is distinguished over the prior art in general, and these patents in particular by an adjustable tripod stand with independently adjustable legs which comprises a longitudinal extensible upright portion of telescoping tubular members, a plurality of collar members slidably mounted on the upright portion which are longitudinally adjustable relative to one another and to the upright portion for selective positioning thereon, and a plurality of movable leg members are operatively connected to upper and lower collar members for selective independent longitudinal positioning and radial extension relative to the upright portion and to one another. One leg of the tripod is adjustable in length, a sufficient amount, to permit support on two different stairs or steps of an auditorium or stadium.

Various objects, features, aspects, and advantages of the present invention will become more apparent from the following detailed description of preferred embodiments of the invention, along with the accompanying drawings in which like numerals represent like components.

BRIEF SUMMARY OF THE INVENTION

It is therefore an object of the present invention to provide an expandable musical instrument stand made from extruded sections where the extruded sections include a dovetail feature that allows the extruded tubular sections to be locked together.

It is another object of this invention to utilize dovetail locking features to engage tubular sections and allow the stand to become longer. The leg section creates both the leg support and the locking mechanism for the additional tubular extension.

It is another object of this invention to allow the overall height of the instrument stand significantly reduced make the stand easier to transport and store, the long center tube support can be split into two or more pieces and assembled using an existing leg clamp to secure the two center tube sections rigidly together.

Another object of this invention is to provide an adjustable tripod stand that has two or more independently adjustable movable legs providing versatility and stability in the support system.

Another object of this invention is to provide an adjustable tripod stand that allows for the body of the stand to be oriented in a greater off-axis position while maintaining the center of gravity in a stable support system.

Another object of the invention is to allow collars that support the legs, to be slidably adjusted past each other to allow for a greater variety of adjustment.

Another object of the invention is to provide additional extension legs that can be used in combination with the legs of the tripod stand to give greater extension capability for placement of the tripod stand on uneven surfaces.

Another object of the invention is for the geometry of the center tube and the legs to be essentially the same to allow for part commonality and interchangeability.

Another object of the invention is to allow the position of the leg brace to be adjustable to allow the angular arc or position of the leg to be adjusted beyond a single fixed fulcrum brace point.

A still further object of this invention is to provide an adjustable tripod stand for supporting articles which is simple in construction, light-weight, economical to manufacture, rugged and reliable in use.

A further object of the present invention to provide an adjustable tripod stand that has independently adjustable movable legs for supporting cantilevered drums, including timbale, tenor, snare, and bass drums.

Various objects, features, aspects, and advantages of the present invention will become more apparent from the following detailed description of preferred embodiments of the invention, along with the accompanying drawings in which like numerals represent like components.

DETAILED DESCRIPTION

Figure 1:
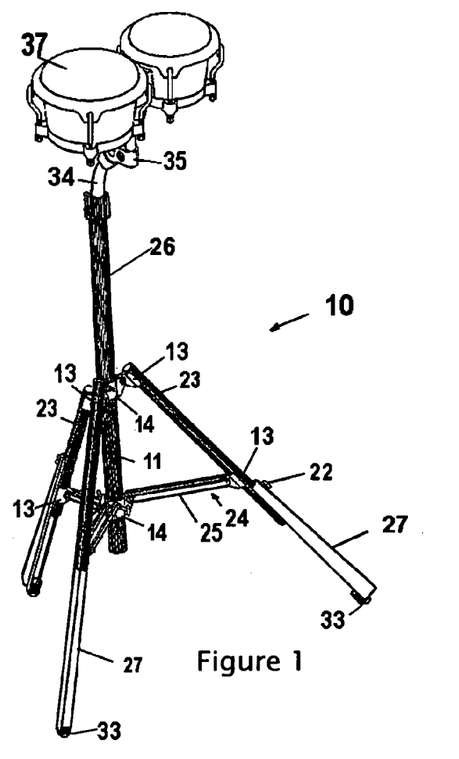
FIG. 1 is an isometric view of a preferred, adjustable-tripod-stand for bongo drums in accordance with one embodiment of the present invention.
Figure 2:
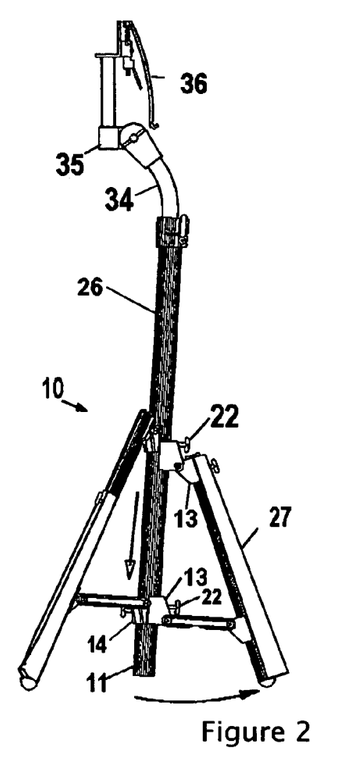
FIG. 2 is a view in side elevation of the adjustable tripod stand shown in FIG. 1.
Figure 3:
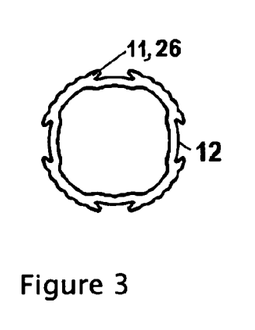
FIG. 3 is an end view of one of the center tubes or legs of the tripod.

Referring to the drawings by numerals of reference, there is shown in FIGS. 1, 2, 6, 7 and 8, a preferred adjustable tripod stand 10 having a longitudinal lower upright center tube 11 and longitudinal upright center tube 26, which is fluted with a plurality of circumferentially spaced grooves 12, shown in the cross section of tubes 11 and 26 in FIG. 3, extending longitudinally of its exterior surface. There are four grooves 12 which are equally spaced and dovetail shaped in cross section. Fluted tubes 11 and 26 are used for the upright support of the tripod and for the legs 23. These legs can be the same geometry and diameter or could be constructed with different geometry or different diameters.

The upper apex of two of the legs 23 is connected to the central tube 11 with a semi-circular (half tube) leg support collar member 14. A second semi-circular (half tube) leg support collar member 14 attaches two of the legs 23 to the leg braces 24 in the mid portion of lower tube 11. It should be noted here that the semi-circular leg support 14 is used as both an upper and a lower support for the two legs where they slide and attach to the center tube 11. The upper apex of one of the legs 23 is connected to the central tube 11 with a semi-circular leg supporting collar member 13. A second semi-circular leg support collar 13 also attaches the leg 23 to the leg brace 24 in the mid portion of the lower tube 11. It should be noted here that the semi-circular leg support 13 is used as both an upper and a lower support for a single leg where they slide and attach to the center tube 11 and in addition the leg support 13 is utilized as a connection from a single tube to another tube and from a single tube to a brace such as item 25. These collars 13 and 14 are slidably mounted on center tube 11. Semi-circular leg brace support collar members 13 for one of the legs 23 and a collar member 14 for two of the legs 23 are slidably mounted on center tube 11. The center tubes and legs are shown with different diameter tubing but in some embodiments the center tube and the legs are constructed from the same tubular material.

The position of the leg brace on the leg is adjustable to change the angular arc for the leg position. Ideally the leg brace is placed in the middle of the length of the leg, but other locations of the leg brace can be set to change how far the leg can be extended from the center tube. In one contemplated embodiment one leg is shorter that the other two legs. The position of the collar 13 on the shorter leg is placed at the apex where the longer legs are secured to center tube 11. This provides additional support to the tripod stand to prevent or reduce flexing or motion while an instrument is being played.

As described above, the legs may also be extended radially inward and outward. This allows for placement of the stand on an uneven or multi-level surface or platform and also in limited or confined areas. The legs may be adjusted relative to an uneven or multi-level surface to cause the vertical axis of the stand to be disposed in an off-vertical axis position for placing the center of gravity of the supported article relative to the center of the supporting legs even if they are at different heights.

If one of the upper leg collar members 13 and its corresponding leg brace collar member 13 is moved closer together on the center tube 11, the bottom of the leg(s) connected thereto will be extended radially outward to be positioned an unequal distance from the center of the center tube 11 relative to the other leg(s).

When one of the upper leg collar members 13 and its corresponding leg brace collar members 13 is moved away from the other on the center tube 11, the bottom of the leg(s) connected thereto will be drawn radially inward to be positioned an unequal distance from the center of the tube 11 relative to the other leg(s).

As seen in FIG. 1, the upper leg collar members 13, 14 and leg brace collar members 13, 14 are movable from a position where the tripod legs are collapsed to a position where the bottom of the legs will extend radially an equal distance from the center of tubular member 11.

Figure 4:
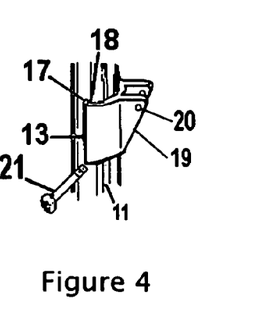
FIG. 4 is an isometric view of one of the leg clamps positioned on the center tube or leg tube of the tripod.
Figure 5:
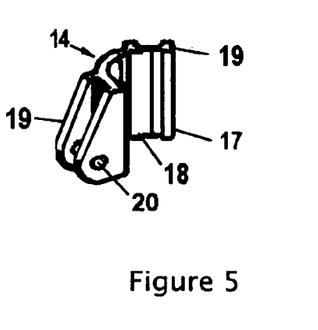
FIG. 5 is an isometric view of one of the clamps for the tripod shown in FIGS. 1 and 2.
Figure 12:
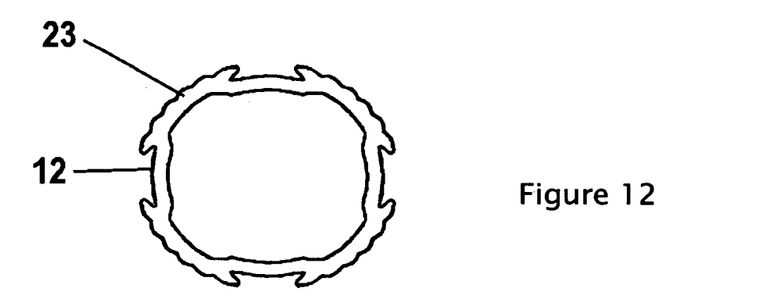
FIG. 12 is an end view of one of the center tubes or legs of the tripod.

One collar members 13 is shown detailed in FIG. 4, and collar member 14 as shown detailed in FIG. 5. Members 13 and 14 are semi-circular in cross section with the longitudinal ears 18 and edges 17 formed inwardly to fit in the dovetail longitudinal grooves of the center tubes 11 and 26 as shown in cross sectional detail in FIG. 3. The geometry of the center tube (FIG. 3) and the geometry of the leg(s) 23 as show in FIG. 12 could be essentially the same allowing for interchangeability of the center tube and leg components. Collar members 13 (FIG. 4) and 14 (FIG. 5) have ears 19 with holes 20 for receiving a hinge bolt 21. FIG. 3 shows a preferred embodiment of the dovetail longitudinal groves 12 arranged in 90 degree orientation pattern, but other arrangements including but not limited to 30, 45, 60, and 120 degree orientations or combinations thereof are contemplated that will provide the desired result. A 120 degree configuration is shown and described in more detail with FIG. 14.

Figures 6, 7:
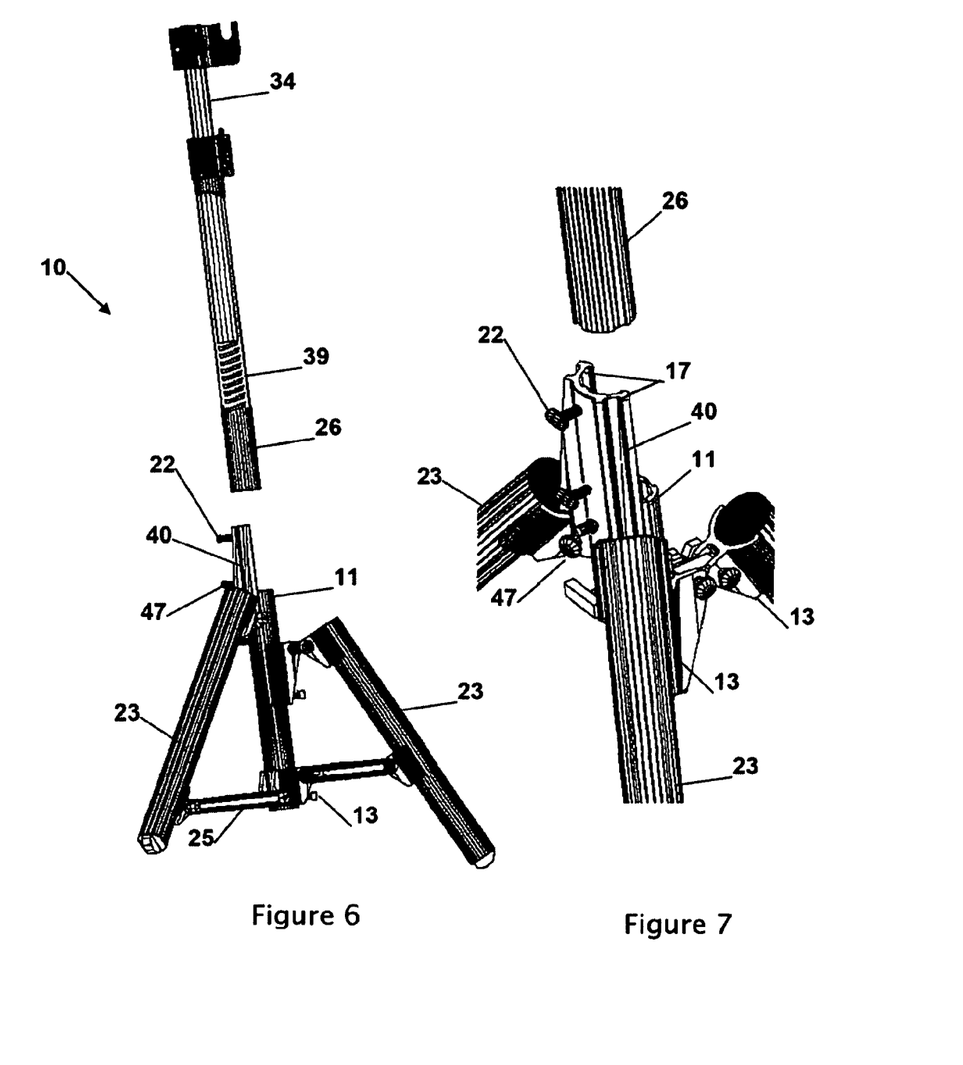
FIG. 6 is a side elevation view of another embodiment of the stand.
FIG. 7 is a detailed view of the collar portion of the stand shown in FIG. 6.
Figure 8:
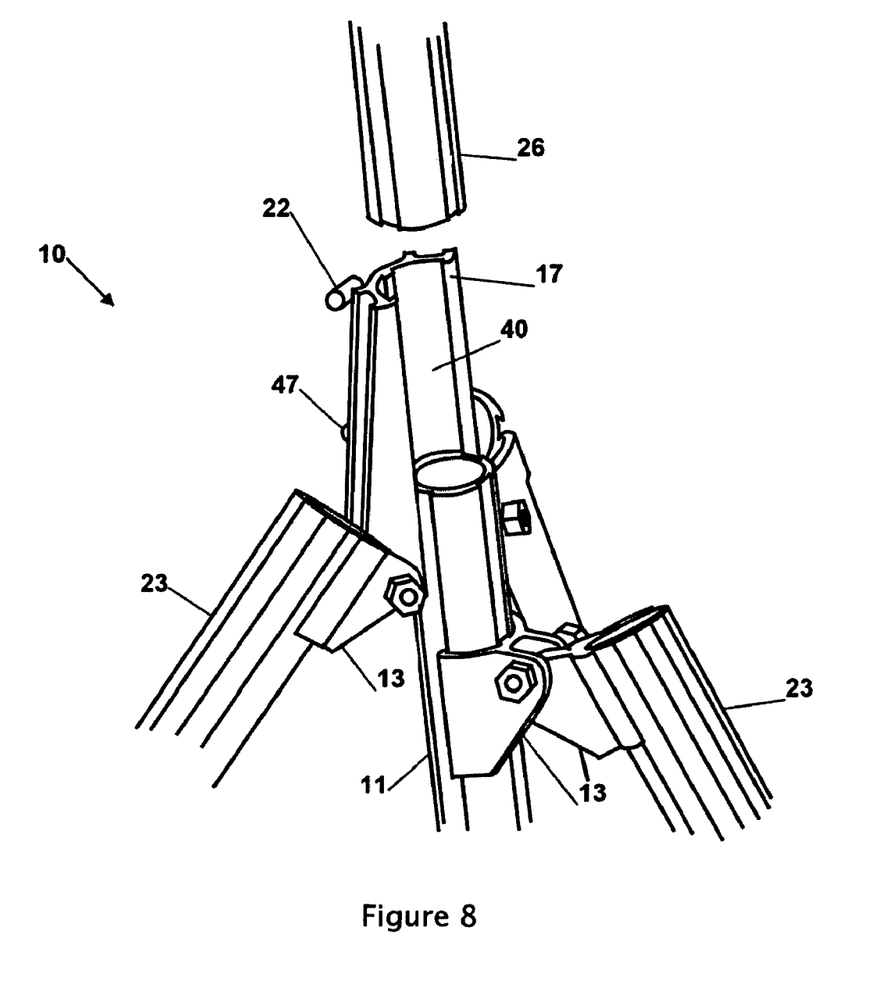
FIG. 8 is an alternate detailed view of the collar portion of the stand shown in FIG. 6.
Figure 14:
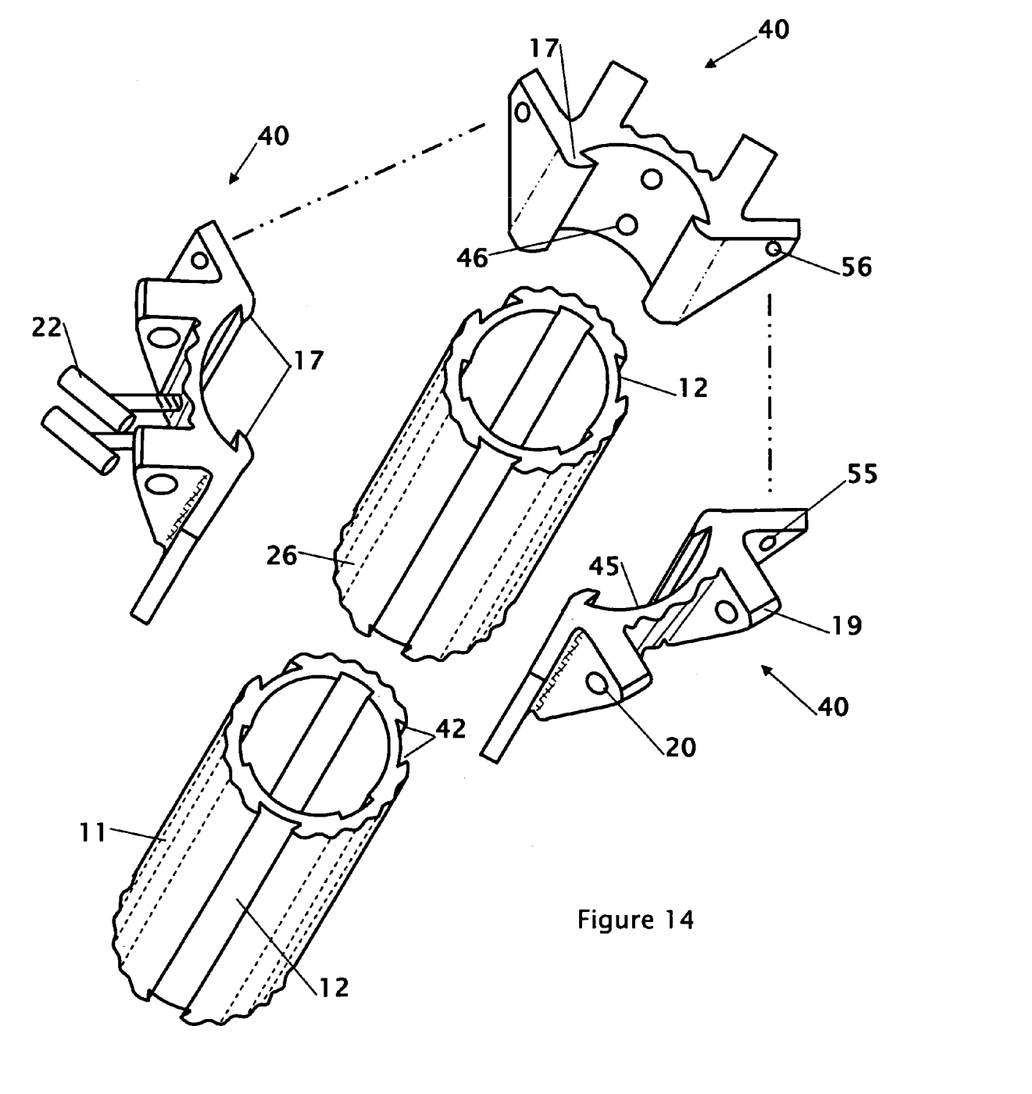
FIG. 14 is an isometric view of the three independent locking collar sliders on a center tube.

Referring to FIGS. 6, 7 and 8 that show various details of the semi-circular locking collar 40 with the locking edges 17 in the collar 40 and corresponding dovetail groves 42 in recesses 12 in the tubes (FIG. 14). Because the playing height of a drum or other percussion instrument requires the instrument stand to be assembled in a tall configuration that can be difficult to transport and store, the dovetail locking feature allows the stand to be broken into shorter sections, and re-assembled into an elongated support stand. The semi-circular collar 40 partially encircles tubes 11 and 26. In the preferred embodiment, the collar is a circular arc of about 180 degrees, but it is contemplated that angles as small as 119 to less than 360 degrees can accomplish locking the tubes. In FIG. 14, the collar is configured in a 120 degree locking segments. The shape of the collar is fabricated from an aluminum extrusion or casting that is an elongated circular ring sector. At or near the proximal edges tabs 17 configured as tapered dovetail tabs exist. The tubes 11 and 26 have multiple recesses 12 with mating tapered groves 42 that the dovetail edges on the collar members 17 engage in. When the collar 40 is brought into position on the tube 11 or 26 such that the collar extends beyond the end of the tube, the collar 40 is locked onto one of the tubes where it binds the collar onto one of the tubes. The locking or binding is from one or more threaded fasteners such as wing screw 47 that secures the collar 40 on the first lower center tube 11 and screw 22 that secures the second upper center tube 26 in the collar 40 (FIGS. 6 & 7) that wedges the collar dovetail tabs into the corresponding dovetail grooves in the tube 11.

In the preferred embodiment one of the legs is configured in a different length than the other legs. The difference in length of the one leg produces and places the center tube in an off vertical axis or prone condition that is ideal for cantilevered placement of a percussion instrument. The cantilevered orientation allows the player to position themselves closer to the instrument being played with minimal interference from the leg(s). In the embodiments shown in FIG. 6 one leg is shorter than the remaining two legs, but it is also contemplated that the odd leg be configured longer than the odd remaining two legs.

Each of the collar members 13, 14 and 40 (FIGS. 1-2, 6, 7, 8 and 14) is independently movable relative to the others on tubular member 11 and 26. Wing screws 22, 47 are provided on the collar members 13, 14, 40 and when tightened, the collar members are locked in a desired position on center tube 11 and 26 or leg tube 23.

The leg brace support collar members 13 (FIG. 2) are substantially similar in construction and operation to the upper leg support collar members 14 (FIG. 1). Each collar member 13 is semi-circular (half tube) in cross section with the longitudinal edges bent inwardly to fit in the longitudinal grooves 12.

Each collar member 13 has a wing screws 22 or thumb screw 47 for locking it in place in the same manner as collar members 13. Thus, each collar 13 is independently movable relative to the others on the center tube, and each may be locked in a desired position on the tube 11, or leg 23.

This allows for placement of the stand in limited or confined areas. If the legs are supported on a level surface, this adjustment will cause the longitudinal, vertical axis of the stand to be disposed in an off-vertical axis position for placing the center of gravity of the supported article relative to the center of the supporting legs. This adjustment also provides a minimum or maximum peripheral support base.

It can be seen from detailed FIGS. 7 and 8 that the collar 40 is locked in a position that extends above the lower tube 11. This extension above the lower tube allows the upper tube 26 to be slid down the collar and placed into position in an abutted orientation with the lower tube 11 (FIG. 14). The upper tube 26 is similar or the same extruded construction as the lower tube 11 which includes multiple recessed 12 with mating tapered groves 42 that the dovetail edges 17 engage in. One or more threaded fasteners 22 or 47 (FIGS. 6, 7 and 8) wedge the collar dovetail tabs into the corresponding dovetail grooves in tube 26 to form an extended support shaft. In the configuration shown the collar is combined with the leg support, but other embodiments are contemplated that do not include the leg support with the collar. Only one collar is shown in the figures but it is contemplate that multiple collars, each with an extending tube can be us used to extend the assembly to a greater length. It is also contemplated that the collars can be used with the legs of the stand to provide a wider support base.

An elongate telescoping inner tubular member 34 (FIGS. 1 and 2) is slidably received within the center tube 11 and or 26 and anchored in position by a wing screw or locking clamp. The upper end of inner telescoping tubular member 34 has a bracket 35 and pivoted locking member 36 for securing drums 37 in place. This tripod is designed for supporting a bongo drum but other drums may be supported if desired. In FIG. 6, a portion of upper tube 26 has been cut away showing a lift spring 39 that assists the inner telescoping tubular member 34. While a spring has been shown as the lift assisting mechanism other lifting mechanisms including but not limited to a spring, gas filled strut or other similar lifting mechanism are contemplated to assist a user to extend the telescoping inner tube member 34 out of the center tube 26.

The top portion of the stand may have various conventional tripod mounting hardware for mounting a variety of articles and instruments including but not limited to such things as cameras, video equipment, telescopes, surveying instruments, and musical instruments. It should be understood that the particular tripod stand illustrated has a top portion configured to support musical drums however other top portions may be provided for supporting such things as cameras, video equipment, telescopes, surveying instruments, and the like.

Figure 11:
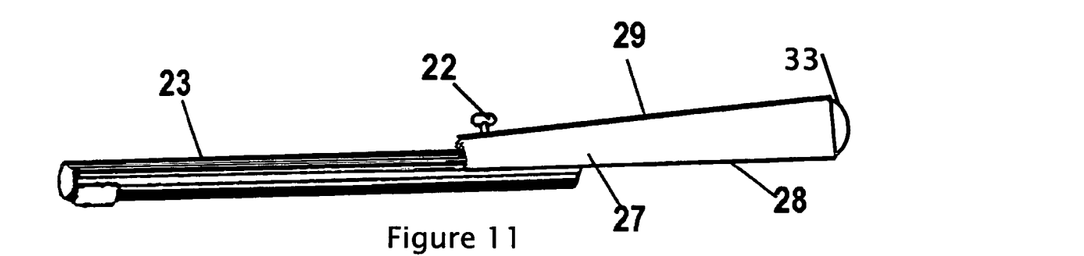
FIG. 11 is a side view of the leg extender shown in FIGS. 1, and 2.

Each of leg members 23 optionally includes a leg extender member 27 slidably supported thereon as shown in FIG. 1, 2 and 11. Leg extender member 27 has a semi-circular (half tube) collar portion 28 and a rigid leg portion 29. Collar portion 28 has longitudinal edges 30 (FIG. 13) formed inwardly 17 to fit in the dovetail longitudinal grooves 12 (FIG. 12) for sliding movement to extend one of the leg members 23.

Center tube 11 is adjustable up or down relative to collar members 14 and 13. Leg extenders 27 are adjustable to permit the tripod assembly 10 to fit on extreme different levels, when the tripod is used on the stairs or steps of a stadium or auditorium.

Figure 13:
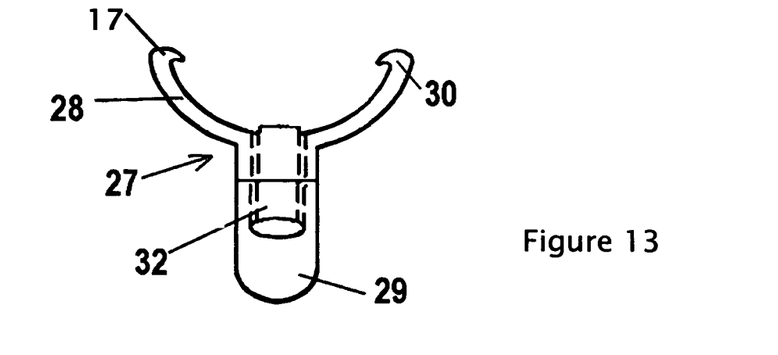
FIG. 13 is an end view of a slider that operates with the center tube and leg tube shown in FIG. 12.

Referring now to FIGS. 11 and 13, a wing screw 22 fits threaded aperture 32 (FIG. 13) in leg extender member 27 for locking in any selected position. The bottom end of each leg extender member 27 has a footpad 33 (FIGS. 1 and 11) formed of resilient material. It should be understood that the bottom end of each leg member 27 may have a wheel or caster (not shown).

In addition to the adjustment described above, the upper leg support collars 14 and the leg brace collars 13 may be positioned in vertically spaced pairs relative to the other vertically spaced pair. For example, one of the upper leg collar segments 14 and its corresponding leg brace collar segment 13 may both be moved upward on the tubular member 11 relative to the other pair and the bottom of the leg(s) connected to the upper pair will be raised relative to the other leg(s).

Figure 9:
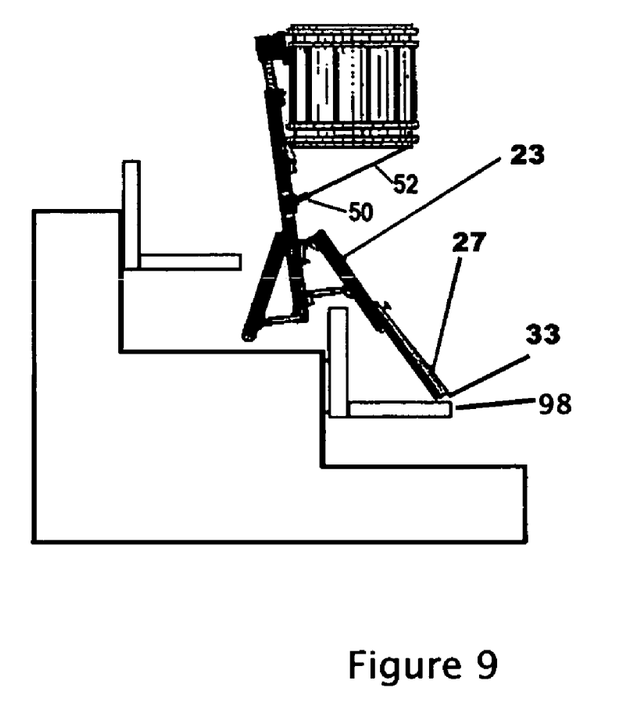
FIG. 9 is a detailed side view of one of the tripod legs with a leg extender in the extended position.
Figure 10:
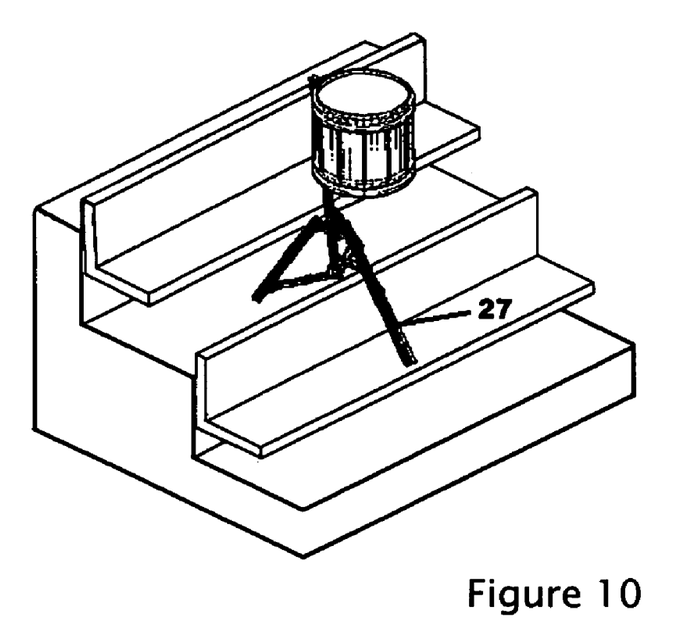
FIG. 10 is an isometric view of the tripod leg on which the extender is supported.

Referring now to FIGS. 9 and 10 that show a side elevation view and isometric view of the tripod and snare drums installed on the steps or stairs of a stadium or auditorium. Each of leg members 23 may have a leg extender member 27 slidably supported thereon (construction being the same as in FIGS. 11-13). The leg extender member 27 has a semi-circular (half tube) collar portion and a rigid leg portion. The collar portion has longitudinal edges formed inwardly to fit in the dovetail longitudinal grooves 12 for sliding movement to extend one of the leg members 23. The bottom of the extendable leg member 27 is extended until it reaches ground, or in the figures shown, a lower bench 98 (FIG. 9). Foot pad 33 increases the friction between the leg extension 27 and the bench 98 to reduce movement of the stand. In FIG. 9 a pivoting bracket 52 pivots and extends from the collar to the far underside of the drum in this figure. The collar 50 may provide the link coupling of the upper and lower tube into an extended unit. The collar and bracket provide additional support to the drum to reduce the cantilevered weight of the drum and reduce movement of the drum when it is being played. The collar member engages into the dovetail elongated grooves of the center tube and includes a locking mechanism to prevent movement on the center tube.

A semi-circular (⅓ of a circle tube) upper leg support collar members 40 for one of the, legs are shown. These three sets of sliders allow the three sets of legs to move and slide independent of each other and past each other. Two or all three of the collars can be connected or linked using the holes 55 and 56 on each flange to lock the collars together. In the preferred embodiment two of the collars are linked together and the third collar is independent from the other two. The linking of the collars provides for fewer components to adjust in the field and allows for faster set-up and take down.

Each of the collar members 40 is semi-circular in cross section with the longitudinal edges 17 formed inwardly to fit in the dovetail 42 longitudinal grooves 12. Collar member(s) 40 have portion 45 with in-turned portions with dovetail features 17 and ears 19 with holes 20 for receiving a hinge bolt.

Each of the collar members 40 is independently movable relative to the others on tubular members 11 and 26. Wing screws 22 are provided on the collar members 40 and when tightened into hole 46, the collar members 40 are locked in a desired position on center tube 11 or 26. One hole is used with a fastener to lock the collar on one tube member 11 while the other hole is used with a fastener to lock the collar on a second tube member 26.

Figure 15:
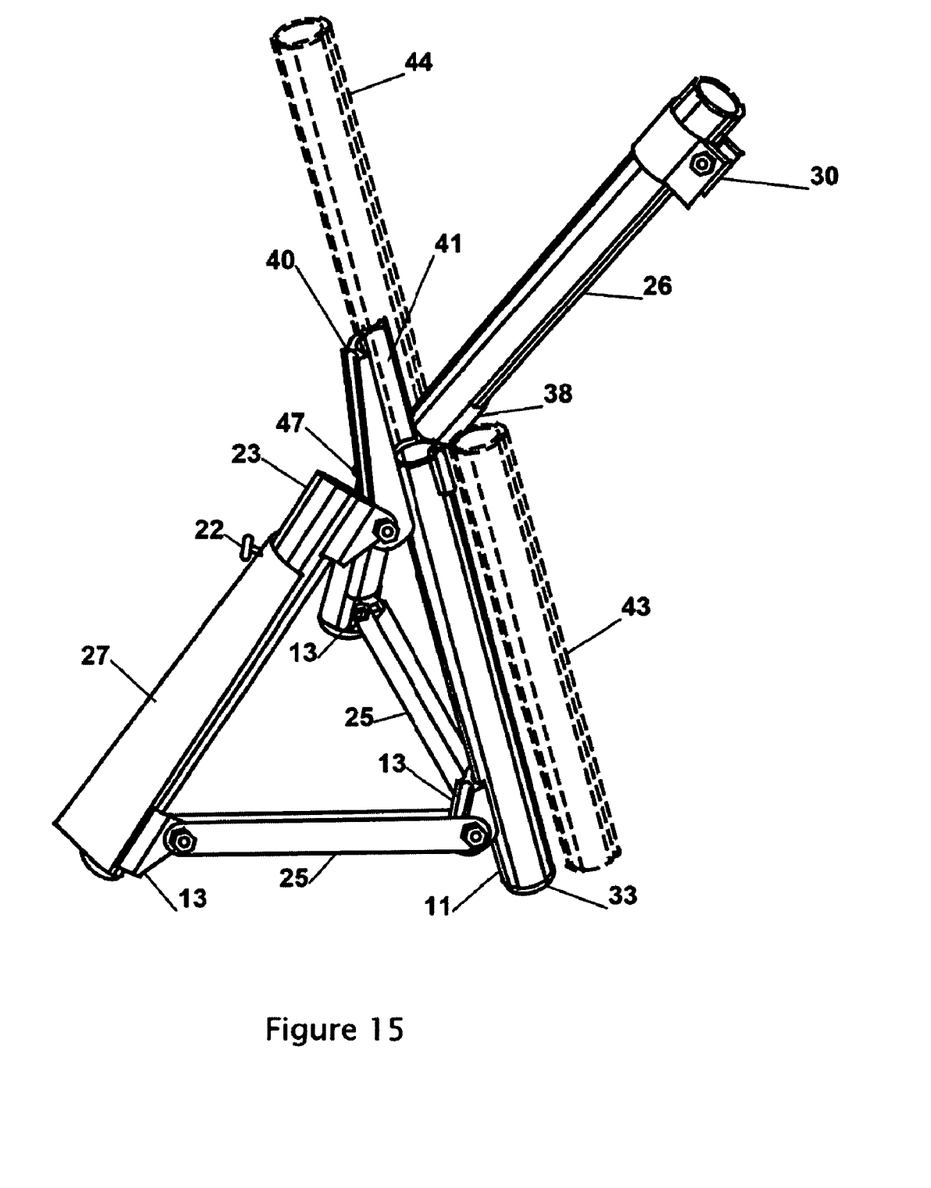
FIG. 15 is an isometric view of a three leg stand where the center post is hinged.

FIG. 15 is an isometric view of a three leg stand where the center post is hinged and the center tube is further used as one of the leg supports. In another contemplated embodiment the hinge exists on the semi-circular collar, and the second tube member 26 rotates up from behind the stand where it is held in position by the weight of a drum secured to the top of the stand. The lower center tube member 11 in this configuration forms one of the three support legs. The remaining two legs 23 extend from the semi-circular collar 40 that is slidably connected to the leg/center tube 11. The semi-circular collar 40 engages on the lower center tube 11 and is held in position on the lower center tube 11 with fastening winged hardware 47 consisting essentially of a threaded fastener that binds the semi-circular collar 40 onto the lower tube member 11. An upper center tube member 26 is coupled to the lower center tube 11 with a hinge 38. The hinge allows the upper tube to rotate from a position where it is essentially along (side shown as phantom 43 the lower tube 11 to a position where it abuts the top end of the lower tube shown as phantom 44. When the upper center tube is in the upper position the upper center tube 26 is cradled 41 in the semi-circular collar 40. Because the upper center tube 26 is in a position off of vertical it tends to stay nested in the semi-circular collar 40. It is further contemplated that a latching or fastening mechanism can be incorporated into the assembly that will positively retain the upper tube in its stacked orientation to eliminate the possibility that the upper tube can rotate out of the semi-circular saddle 40 when not desired.

A mounting apparatus 30 for a drum or other percussion hardware is located at or near the end of the upper tube member 26 for attaching a percussion instrument. One or more of the supporting legs 23 or lower center tube 11 can have a leg extender 27 that is slidably attached to the leg/tube. Only one leg extender is shown in this figure but it is contemplated that a leg extender can exist on each of the legs as well as the upper and lower tubes to further increase the overall height of the stand. The leg extender 27 can be slid down the leg and locked into position allowing the structure to become taller and or account for an uneven floor surface. The leg extender 27 has locking hardware 22 to enable the leg to be locked in position on the leg 23 or center tube 11. A foot pad 33 exists on the bottom of each leg and or the leg extender to provide protection for the ground, the end of the tube, and to reduce movement of the stand with the ground. Leg braces 25 connect the bottom of the legs 23 with a slider 13 on the center tube 11. The position of the slider 13 can be adjusted to collapse the legs against the center tube or expanded to provide a wide support stance.

In another contemplated embodiment the drum is mounted on the end of upper tube 26 and the drum is placed on the right hand side relative to this figure. Collar 40 is loosened and slid in its upright position to get past the top of collar 40. The tubes are then slid back down into collar 40 where they are locked in orientation.

In another contemplated embodiment the upper and lower tubes are joined with mating details that allow the tubes to engage, at least partially, within each other as well as provide an anti-rotational function. Contemplated details include but are not limited to teeth, splines, keys or pins. These details can exist internally and or externally from the tube or shaft to allow for stacking and or anti-rotation of the joined tubes, rods or shafts.

Referring to FIG. 14 that shows an isometric view of the three independent collars on center tubes 11 and 26. The center tube is a longitudinal center tube, which is fluted with a plurality of circumferentially spaced grooves 12 extending longitudinally along its exterior surface. There are six grooves 12, which are equally spaced and dovetail shaped in cross section. Fluted tubes 11 and 26 are used for the center tube support of the tripod and for the legs.

Thus specific embodiments and applications for an adjustable tripod stand have been disclosed. It should be apparent, however, to those skilled in the art that many more modifications besides those described are possible without departing from the inventive concepts herein. The inventive subject matter, therefore, is not to be restricted except in the spirit of the appended claims.

What is claimed is:

1. A modular supporting stand comprising:
a first center member supported by at least three legs where the angular orientation of each leg relative to the first center member is adjustable by sliding at least one semi-circular collar on the first center member; wherein
the location of at least one semi-circular collar can be locked onto the first center member allowing a second center member to be placed within the at least one semi-circular collar and positioned on top of the first center member, and
the at least one semi-circular collar includes a locking means to secure the second center member to the first center member to extend the height of the supporting stand.

2. The modular supporting stand according to claim 1 wherein the first and second center members are extruded and include at least two elongated recesses.

3. The modular supporting stand according to claim 1 wherein the semi-circular collar includes inwardly facing longitudinal edges for fitting in dovetail longitudinal grooves within the first and second center members.

4. The modular supporting stand according to claim 1 wherein the first and second center tube are further joined with a rotational, pivoting or hinged mechanism.

5. The modular supporting stand according to claim 1 wherein the geometry of the center member and the leg members are essentially the same.

6. The modular supporting stand according to claim 1 wherein at least two semi-circular collars can be linked such that they move together.

7. The modular supporting stand according to claim 1 which semi-circular collars can translate past each other on the center members.

8. A modular stand comprising:
a first elongated member;
a second elongated member placed in an end abutted orientation to the first elongated member;
a semi-circular collar with locking means that locks the first elongated member to the second elongated member without the collar or locking means encircling either member wherein the first and second elongated members include at least two elongated recesses.

9. The modular stand according to claim 8 that further includes at least two legs with supports that attach to least one of the elongated members to create a base structure.

10. The modular stand according to claim 8 wherein the elongated members are rods, or hollow members or semi-circular arch sectors.

11. The modular stand according to claim 8 wherein the semi-circular collar includes inwardly facing longitudinal edges for fitting in dovetail longitudinal grooves within the first and second elongated members.

12. The modular stand according to claim 8 wherein the locking means clamps the first elongated member to the semi-circular collar wedging dovetail details in the first elongated member and the semi-circular collar.

13. The modular stand according to claim 8 wherein the first and second elongated members are further joined with a rotational, pivoting or hinged mechanism.

14. The modular stand according to claim 8 wherein the semi-circular collar can be moved by translating the semi-circular collar on the first and or second elongated member.

15. The modular supporting stand according to claim 1 wherein the diameter of the first and second upright members are essentially the same.

16. The modular supporting stand according to claim 1 wherein the geometry of the first and second upright members are essentially the same.

17. The modular supporting stand according to claim 1 wherein at least one of said center members further includes an elongate telescoping inner tubular member that extends from within said at least one center member under the force of a spring or gas filled strut.

18. The modular supporting stand according to claim 8 wherein the diameter of the first and second elongated members are essentially the same.

19. The modular supporting stand according to claim 8 wherein the geometry of the first and second elongated members are essentially the same.

* * * * *